US010044436B2

(12) United States Patent
Chen et al.

(10) Patent No.: US 10,044,436 B2
(45) Date of Patent: *Aug. 7, 2018

(54) MULTI-CHANNEL SATELLITE ANTENNA CALIBRATION

(71) Applicant: Space Systems/Loral, LLC, Palo Alto, CA (US)

(72) Inventors: Chih-Kang Chen, Sunnyvale, CA (US); Tyson Shimomi, San Mateo, CA (US)

(73) Assignee: Space Systems/Loral, LLC, Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/470,600

(22) Filed: Mar. 27, 2017

(65) Prior Publication Data

US 2018/0034541 A1 Feb. 1, 2018

Related U.S. Application Data

(63) Continuation of application No. 15/225,588, filed on Aug. 1, 2016.

(51) Int. Cl.
*H04B 7/212* (2006.01)
*H04B 17/12* (2015.01)
(Continued)

(52) U.S. Cl.
CPC ......... *H04B 7/2125* (2013.01); *H04B 7/0421* (2013.01); *H04B 17/12* (2015.01);
(Continued)

(58) Field of Classification Search
CPC ........ H04B 17/10; H04B 17/11; H04B 17/12; H04B 17/13; H04B 17/21; H04B 17/24;
(Continued)

(56) References Cited

U.S. PATENT DOCUMENTS 5,530,449 A * 6/1996 Wachs ................... H01Q 3/267
342/174
6,163,296 A 12/2000 Lier et al.
(Continued)

FOREIGN PATENT DOCUMENTS

CN 102413082 8/2014
EP 0 713 261 A1 5/1996
(Continued)

OTHER PUBLICATIONS

Notice of Allowance dated Jan. 17, 2017 in U.S. Appl. No. 15/225,588.
(Continued)

*Primary Examiner* — Meless Zewdu
(74) *Attorney, Agent, or Firm* — Weaver Austin Villeneuve & Sampson LLP

(57) ABSTRACT

This disclosure provides systems, methods and apparatus for multi-channel satellite calibration. In one aspect, a calibration system can provide a transmit calibration signal based on a reference calibration signal to a satellite. The satellite can transmit back a receive calibration signal that can be obtained by the calibration system. Sub-carriers of the receive calibration signal can be compared with sub-carriers of the reference signal to determine adjustments to transmission properties of antennas of the satellite.

20 Claims, 7 Drawing Sheets

(51) Int. Cl.
  *H04B 7/0417* (2017.01)
  *H04B 17/21* (2015.01)
  *H04B 17/24* (2015.01)
  *H04B 17/29* (2015.01)
  *H04B 17/309* (2015.01)

(52) U.S. Cl.
  CPC ............ *H04B 17/21* (2015.01); *H04B 17/24* (2015.01); *H04B 17/29* (2015.01); *H04B 17/309* (2015.01)

(58) Field of Classification Search
  CPC ........ H04B 17/30; H04B 7/084; H04B 7/208; H04B 7/185; H04B 7/18517; H04B 7/18502; H04B 7/18513; H04B 7/18528; H04B 7/18578; H04B 7/18595; H04B 7/2041; H04B 7/18519; H04B 7/15578; H04B 7/066; H04B 7/2125; H04B 7/0421; H04B 17/309; H04B 17/29; H04B 7/212; H04B 7/04; H04B 17/00; H04B 17/104; H04B 17/14; H04B 7/204; H04B 7/0417; H04W 56/00; H04W 56/0005; H04W 56/001; H04W 56/0015; H04W 56/002; H04W 56/005; H04W 84/06
  See application file for complete search history.

(56) References Cited

U.S. PATENT DOCUMENTS

| | | | |
|---|---|---|---|
| 6,266,007 B1 * | 7/2001 | Lennen | G01S 19/235 342/174 |
| 6,597,730 B1 * | 7/2003 | Bader | H01Q 1/241 375/219 |
| 8,923,756 B1 * | 12/2014 | Freedman | H04B 7/2041 455/12.1 |
| 9,450,666 B1 * | 9/2016 | Freedman | H04B 7/19 |
| 9,642,107 B1 * | 5/2017 | Chen | H04W 56/0015 |
| 2002/0171583 A1 | 11/2002 | Purdy et al. | |
| 2004/0061644 A1 | 4/2004 | Lier et al. | |
| 2005/0190104 A1 | 9/2005 | Coleman et al. | |
| 2006/0058022 A1 * | 3/2006 | Webster | H01Q 3/267 455/423 |
| 2008/0094276 A1 | 4/2008 | Kegel | |
| 2008/0150793 A1 * | 6/2008 | Bast | G01S 7/4017 342/174 |
| 2008/0297426 A1 * | 12/2008 | Jung | H01Q 3/08 343/765 |
| 2009/0109085 A1 | 4/2009 | Needham et al. | |
| 2010/0164782 A1 | 7/2010 | Saha et al. | |
| 2011/0019722 A1 | 1/2011 | Amirkhany | |
| 2012/0139776 A1 | 6/2012 | Malmqvist et al. | |
| 2012/0281744 A1 | 11/2012 | Guo et al. | |
| 2013/0293415 A1 * | 11/2013 | Gutt | G01S 19/40 342/357.25 |
| 2014/0232596 A1 | 8/2014 | Apker et al. | |
| 2014/0362896 A1 | 12/2014 | Aymes et al. | |
| 2015/0016240 A1 | 1/2015 | Chang | |
| 2016/0014786 A1 | 1/2016 | Chang | |
| 2016/0020817 A1 | 1/2016 | Chen | |
| 2016/0301484 A1 | 10/2016 | Zhu et al. | |

FOREIGN PATENT DOCUMENTS

| | | | | |
|---|---|---|---|---|
| WO | WO 2012003749 A1 * | 1/2012 | | H04B 17/12 |
| WO | WO 2014/204532 | 12/2014 | | |

OTHER PUBLICATIONS

Extended European Search Report dated Dec. 20, 2017 in EP Application No. 17180804.1.

* cited by examiner

MULTI-CHANNEL SATELLITE ANTENNA CALIBRATION

CROSS REFERENCE TO RELATED APPLICATION

This disclosure claims priority to U.S. patent application Ser. No. 15/225,588, filed Aug. 1, 2016, entitled "MULTI-CHANNEL SATELLITE CALIBRATION," and assigned to the assignee hereof, the disclosure of which is incorporated by reference in its entirety into this Patent Application.

TECHNICAL FIELD

This disclosure relates generally to calibrating a multi-channel satellite, and more particularly to a multi-channel satellite calibration system using a ground station to adjust transmission properties of antennas of the satellite.

BACKGROUND

Satellites for communications and broadcast services can operate in orbit to communicate to a ground device by generating a forward user downlink signal for reception by the ground device. In return, the ground device can transmit back a return user uplink signal to the satellite. Often, the forward user downlink signal is based on the transmission of several signals from several antennas configured as a phased array antenna. If the phases and amplitudes of the signals are relatively similar, then the signals can be coherently combined. This results in a higher-powered forward user downlink signal as received by the ground device.

The phased array antenna should be calibrated to increase the power of the forward user downlink signals, and therefore, increase the performance of the communication from the satellite to ground devices. Thus, an improved system for calibrating channels of a satellite is desired.

SUMMARY

The systems, methods and devices of this disclosure each have several innovative aspects, no single one of which is solely responsible for the desirable attributes disclosed herein.

One innovative aspect of the subject matter described in this disclosure can be implemented in a system comprising a calibration system communicatively coupled with a spacecraft, the calibration system configured to: provide a transmit calibration signal to a plurality of channels of the spacecraft, the transmit calibration signal including a first plurality of sub-carrier signals corresponding to non-overlapping frequency components, each of the channels associated with a corresponding antenna; obtain from the spacecraft, concurrently for all of the channels, a receive calibration signal including a second plurality of sub-carrier signals derived from the first plurality of sub-carrier signals; determine a first set of differences between the first plurality of sub-carrier signals and the second plurality of sub-carrier signals; and use the determined first set of differences to adjust one or more transmission properties of the antennas.

In some implementations, the one or more transmission properties include signal phases and amplitudes, and the system is further configured to calculate, using the determined first set of differences, equalization adjustments to the signal phases and amplitudes.

In some implementations, the one or more transmission properties include one or more of a signal phase, amplitude, group delay, or power level.

In some implementations, the first plurality of sub-carriers are derived from a third plurality of sub-carriers of a reference signal, the reference signal being an orthogonal frequency-division multiplexed (OFDM) signal.

In some implementations, the third plurality of sub-carriers are compared with the second plurality of sub-carriers to determine a second set of differences between the first plurality of sub-carriers and the second plurality of sub-carriers.

In some implementations, a first frequency range of the third plurality of sub-carriers is wider than a second frequency range of the second plurality of sub-carriers.

In some implementations, frequency components corresponding to the third plurality of sub-carriers are frequency shifted to generate the transmit calibration signal.

In some implementations, the frequency components corresponding to the third plurality of sub-carriers are frequency shifted to be within the frequency range of the second plurality of sub-carriers.

Another innovative aspect of the subject matter described in this disclosure can be implemented in a calibration sub-system configured to calibrate transmission properties of antennas of a spacecraft by providing an orthogonal frequency-division multiplexed (OFDM) transmit calibration signal having sub-carriers corresponding to non-overlapping frequency components to the spacecraft, and receiving an OFDM receive calibration signal from the spacecraft and having sub-carriers corresponding to non-overlapping frequency components, and providing an adjustment signal representing adjustments to the transmission properties of the one or more antennas, the adjustments corresponding to changes to one or more of a phase, amplitude, group delay, or power level of signals provided by one or more of the antennas based on a comparison of the sub-carriers of the transmit calibration signal with the sub-carriers of the receive calibration signal.

In some implementations, the adjustments correspond to equalization adjustments representing differences between the sub-carriers of the sub-carriers of the transmit calibration signal with the sub-carriers of the receive calibration signal.

In some implementations, the calibration sub-system system is further configured to generate a reference calibration signal, wherein the sub-carriers of the transmit calibration signal are based on sub-carriers of the reference signal, the reference signal also being an OFDM signal.

In some implementations, the adjustments are based on differences between the sub-carriers of the transmit calibration signal and the receive calibration signal are based on sub-carriers of a reference calibration signal used to generate the transmit calibration signal.

In some implementations, the sub-carriers of the reference signal are compared with the sub-carriers of the receive calibration signal to determine the differences between the sub-carriers of the transmit calibration signal and the receive calibration signal.

In some implementations, a frequency range of the sub-carriers of the reference calibration signal is wider than a frequency range of the sub-carriers of the receive calibration signal.

In some implementations, frequency components corresponding to the sub-carriers of the reference calibration signal are frequency shifted to generate the transmit calibration signal.

In some implementations, the frequency components corresponding to the sub-carriers of the reference calibration signal are frequency shifted to be within the frequency range of the sub-carriers of the receive calibration signal.

Another innovative aspect of the subject matter described in this disclosure can be implemented a method comprising: providing, by a calibration system, a transmit calibration signal having sub-carriers with non-overlapping frequency components; receiving, by the calibration system, a receive calibration system having sub-carriers with non-overlapping frequency components from a spacecraft; generating, by the calibration system, adjustment data representing differences between sub-carriers of the transmit calibration signal and sub-carriers of the receive calibration signal; and providing, by the calibration system, an adjustment signal providing the adjustment data to adjust transmission properties of one or more antennas of the spacecraft.

In some implementations, adjusting the transmission properties include changes to one or more of a phase, amplitude, group delay, or power level of signals provided by one or more of the antennas.

In some implementations, the transmit calibration signal is based on a reference calibration signal having sub-carriers at a wider frequency range than the sub-carriers of the transmit calibration signal.

In some implementations, the transmit calibration signal is an orthogonal frequency-division multiplexed (OFDM) signal.

BRIEF DESCRIPTION OF THE DRAWINGS

The included drawings are for illustrative purposes and serve only to provide examples. These drawings in no way limit any changes in form and detail that may be made by one skilled in the art without departing from the spirit and scope of the disclosed embodiments.

Figure 1:
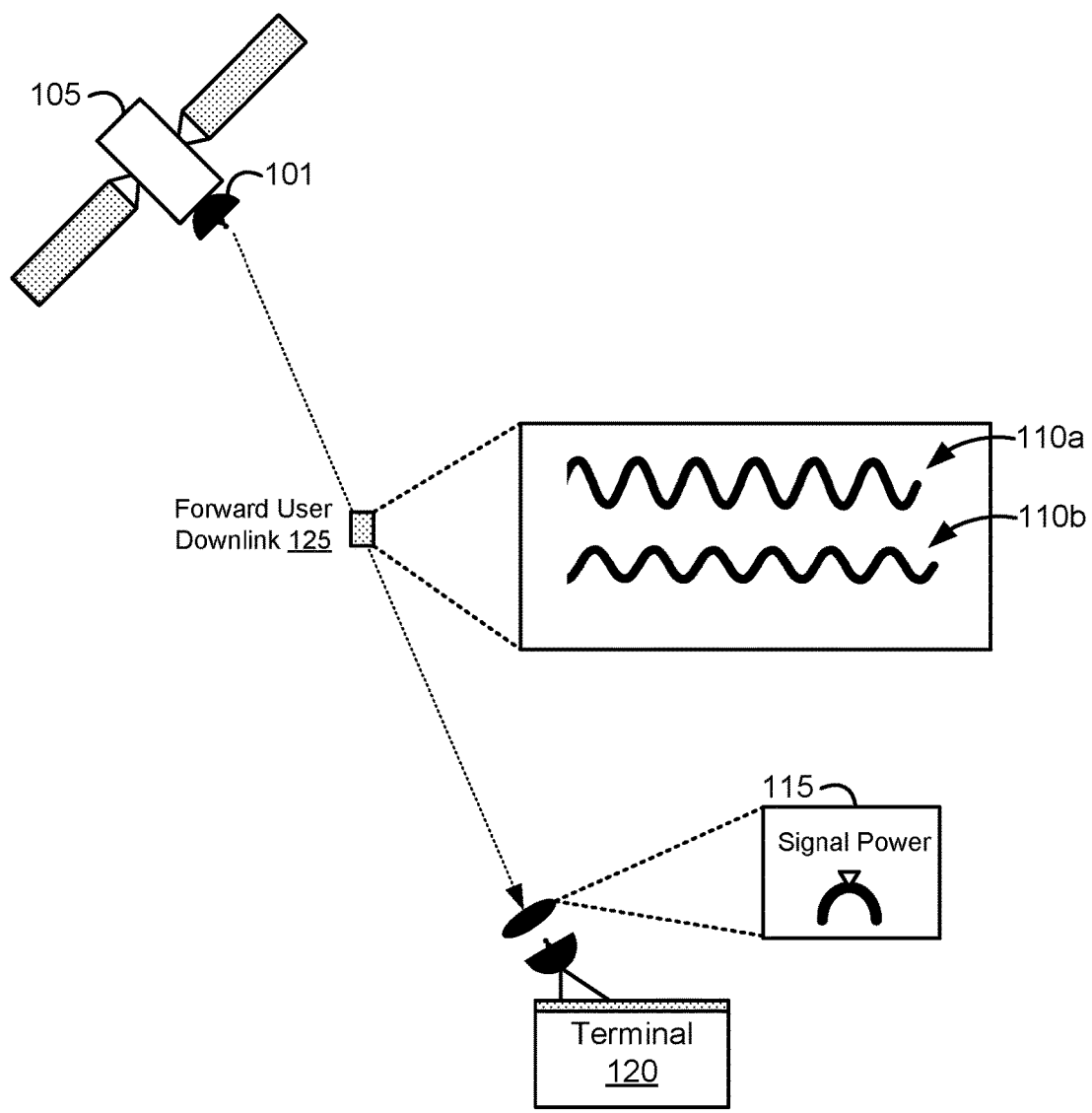
FIG. 1 is an example of an uncalibrated satellite communications network

Throughout the drawings, the same reference numerals and characters, unless otherwise stated, are used to denote like features, elements, components, or portions of the illustrated embodiments. Moreover, while the subject invention will now be described in detail with reference to the drawings, the description is done in connection with the illustrative embodiments. It is intended that changes and modifications can be made to the described embodiments without departing from the true scope and spirit of the disclosed subject matter, as defined by the appended claims.

DETAILED DESCRIPTION

Specific exemplary embodiments will now be described with reference to the accompanying drawings. This invention may, however, be embodied in many different forms, and should not be construed as limited to the embodiments set forth herein. Rather, these embodiments are provided so that this disclosure will be thorough and complete, and will fully convey the scope of the invention to those skilled in the art.

It will be understood that when an element is referred to as being "connected" or "coupled" to another element, it can be directly connected or coupled to the other element, or intervening elements may be present. It will be understood that although the terms "first" and "second" are used herein to describe various elements, these elements should not be limited by these terms. These terms are used only to distinguish one element from another element. As used herein, the term "and/or" includes any and all combinations of one or more of the associated listed items. The symbol "/" is also used as a shorthand notation for "and/or".

The terms "spacecraft", "satellite" may be used interchangeably herein, and generally refer to any orbiting satellite or spacecraft system.

FIG. 1 is an example of an uncalibrated satellite communications network. The satellite communications network in FIG. 1 includes satellite 105 at an orbital location providing downlink communication with terminal 120 (e.g., a user device, such as a phone, tablet, laptop, transportation vehicle, etc.) via generation of forward user downlink signal 125.

Forward user downlink signal 125 may result from constructive or destructive interference from multiple signals provided by satellite 105. For example, satellite 105 can have several channels, each corresponding to a separate transmit antenna. The several transmit antennas may be configured as a phased array antenna 101 providing similar signals that occupy similar (e.g., the same) time (overlap in time and frequency) and frequency characteristics and can be "combined," or superposed, spatially such that forward user downlink signal 125 has a waveform with a lower, higher, or similar amplitude as the signals used to compose it. As a result, forward user downlink signal 125 is a signal that is composed from similar signals from several antennas of the phased array antenna.

However, if the channels of satellite 105 are not well calibrated, then the signal power of forward user downlink signal 125 as received by terminal 120 can be degraded. For example, in FIG. 1, forward user downlink signal 125 is based on signals 110a and 110b, pictorially shown as similar CW (continuous wave) signals wave. That is, signals 110a and 110b are provided by two separate antennas (of separate channels) of the phased array antenna 101 of satellite 105 and together combine to provide forward user downlink signal 125.

For best performance, sub-signals 110a and 110b should have a relatively similar phase shift (e.g., a delay or fraction of a period that the signals have elapsed relative to their origin), and therefore, little or no phase difference between the two. Moreover, in some use cases, the amplitudes should also be relatively similar. However, as depicted in FIG. 1, sub-signal 110b is out-of-phase and has a different amplitude than sub-signal 110a. The reduced coherence can lead to a reduced amplitude of forward user downlink signal 125 (from the combining of signals 110a and 110b), and therefore, a lower power for the signal received by the terminal 120.

Figure 2:
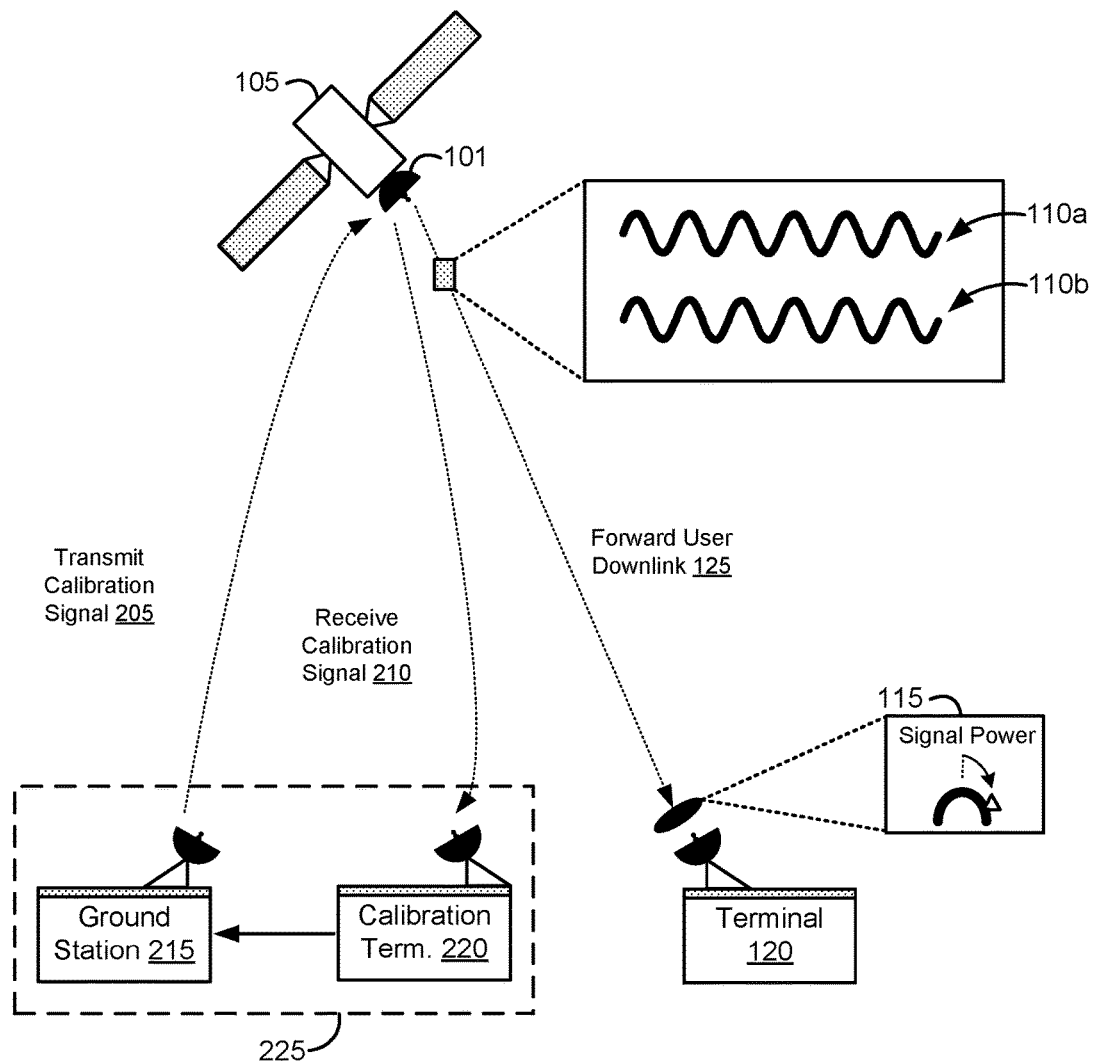
FIG. 2 is an example of a satellite communications network using a ground station to provide multi-channel calibration of a satellite.

FIG. 2 is an example of a satellite communications network using a ground station to provide multi-channel calibration of a satellite. In FIG. 2, ground station 215 is an Earth terminal that can determine whether the channels of satellite 105 are out of calibration. If so, ground station 215 can cause the satellite 105 to adjust properties of the antennas of the phased array antenna 101 such that sub-signals 110*a* and 110*b* are more coherent (i.e., have a similar phase, group delay, and amplitude) thereby increasing signal power 115 of forward user downlink signal 125. Additionally, power levels of signals at particular frequencies can also be adjusted.

For example, in FIG. 2, ground station 215 can provide transmit calibration signal 205 to satellite 105. Transmit calibration signal 205 can be an orthogonal frequency-division multiplexed (OFDM) signal (as a reference, as discussed later herein) that includes a first plurality of sub-carrier signals that are provided at the same or similar time (i.e., overlap in time), but not in frequency (i.e., no overlap in frequency components). Together, the plurality of sub-carrier signals can span the frequency bandwidth for the channels to be calibrated. Each of the channels of satellite 105 can be provided a subset of the sub-carrier signals of the transmit calibration signal 205. The subset of sub-carrier signals similarly span a similar frequency bandwidth of each channel and the sub-carrier frequency spacing can be sufficient to resolve the full frequency response of the channel bandwidth. The sub-carrier signals can be processed by the channels of satellite 105 and forwarded to the phased array antenna 101 for transmission back to ground station 215. For example, a receive calibration signal 210 can be based on a second plurality of sub-carrier signals (also OFDM) for each of the processed sub-carrier signals of the transmit calibration signal 205. Calibration terminal 220 can obtain receive calibration signal 210, provide some processing (e.g., filtering, etc.) and then provide data representing receive calibration signal 210 to ground station 215 (e.g., in the form of a data file or other type of data structure). As a result, functionality and components implemented within ground station 215 and calibration terminal 220 provide calibration system 225. Ground station 215 and calibration terminal 220 can be multiple physical configurations. For example, ground station 215 might be in one location and calibration terminal 220 might be in another location (e.g., several miles away). In another implementation, calibration terminal 220 might be implemented within ground station 215.

Ground station 215 can determine differences between the sub-carrier signals of receive calibration signal 210 (since it obtains data representing that signal from calibration terminal 220) and the sub-carrier signals used to generate transmit calibration signal 205 (as the reference), as discussed later herein. If a channel is determined to be out of calibration based on the differences, ground station 215 may cause the satellite 105 to adjust the phase, amplitude, or group delay of signals provided by satellite 105 or adjust power levels at particular frequency components of signals provided by an antenna (of the phased array antenna 101) for that channel. As depicted in FIG. 2, this results in signal power 115 increasing because sub-signals 110*a* and 110*b* are at the same or similar phase and the amplitude of sub-signal 110*b* has increased, and therefore, combining the two signals better. As a result, forward user downlink signal 125 is received by terminal 120 has a higher signal power 115 than the example of FIG. 1.

The calibration of the channels of satellite 105 can occur at the same or similar time and within a similar frequency bandwidth since transmit calibration signal 205 and receive calibration signal 210 are OFDM signals with sub-carriers with non-overlapping frequency components. This can allow for a more accurate calibration of the channels of satellite 105 since the same conditions (e.g., position of satellite 105, velocity of the satellite 105 relative to ground station 215, temperature, frequency bandwidth, etc.) are present for each of the channels. Once satellite 105 has been calibrated, for example just before regular operation, more effective beamforming can then be performed.

Figure 3:
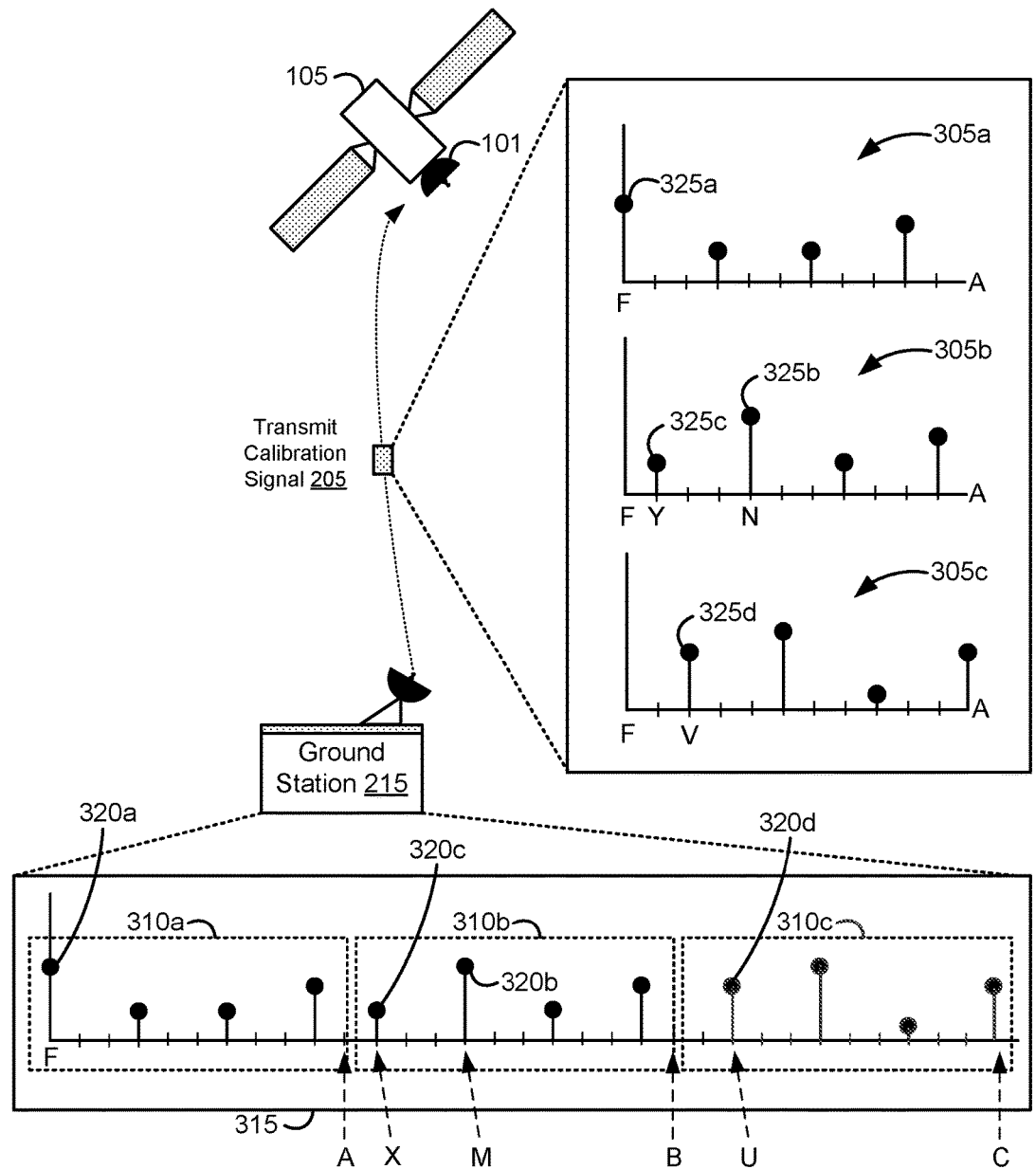
FIG. 3 is an example of providing a calibration signal to a satellite.

In more detail, in FIG. 2, ground station 215 of calibration system 225 may generate transmit calibration signal 205 having sub-carriers with unique frequency components. FIG. 3 is an example of providing a calibration signal to a satellite. In FIG. 3, reference calibration signal 315 includes sets of sub-carriers corresponding to sets of frequency components 310*a*, 310*b*, and 310*c* having frequency components in the frequency domain (i.e., the y-axis is amplitude and the x-axis is frequency) that are used to generate transmit calibration signal 205.

Reference calibration signal 315 includes sets of frequency components 310*a*, 310*b*, and 310*c* that can be used to provide sets of frequency components 305*a*, 305*b*, and 305*c* of transmit calibration signal 205. Each of the frequency components (represented by a circle) represents the amplitude and frequency of a sub-carrier signal making up transmit calibration signal 205. For example, in FIG. 3, reference calibration signal 315 includes sets of frequency components 310*a*, 310*b*, and 310*c* for sets of frequency components 305*a*, 305*b*, and 305*c*, respectively, of transmit calibration signal 205. The frequency components of the sets 310*a*, 310*b*, and 310*c* of reference calibration signal 315 are in separate frequency ranges. For example, the set of frequency components 310*a* range from F (as a starting frequency) to A hertz (Hz), the set of frequency components 310*b* range from a frequency after X to B Hz, and the set of frequency components 310*c* range from a frequency after U to C Hz. This allows for the frequency components to be provided on a single cable (or other medium). However, in other implementations, each of the different sets of frequency components can be provided on different cables and on those cables be within a similar frequency range.

Regarding transmit calibration signal 205, frequency components 305*a* are within the same frequency range (i.e., F to A Hz) as the set of frequency components 310*a*, as well as having the same amplitude. This results in frequency component 320*a* being represented as the similar frequency component 325*a* (at the same frequency F and the same amplitude). Likewise, the other frequency components of the set of the frequency components 310*a* are represented similarly in the set of frequency components 305*a* (i.e., at the same frequencies). By contrast, frequency components 305*b* and 305*c* of transmit calibration signals 205 are within a range from F to A Hz rather than from after A to B and after U to C, respectively. That is, the frequency components 310*b* and 310*c* of transmit calibration signal 205 are in a wider frequency range and have been frequency shifted to be within the same F to A Hz range. Despite being shifted in terms of frequency, the shifted frequency components have similar amplitudes as before.

For example, frequency component 320*c* of the set of frequency components 310*b* of transmit calibration signal 205 is at a frequency of X Hz. Ground station 215 can shift, or offset, each of the frequency components such that they fit within the F to A Hz range, but also such that they are non-overlapping with the frequency components of another set. In FIG. 3, this results in the first frequency component 320*c* of the set of frequency components 310*b* being shifted from X to Y Hz (within the F to A Hz range) and represented by frequency component 325*c* in frequency components 305*b*. Likewise, this also results in the first frequency component 320*d* of the set of frequency components 310*c* being shifted from U to V Hz (within the F to A Hz range) and represented by frequency component 325*d* of the set of frequency components 305c. As a result, each of the frequency components in the latter two sets are shifted.

The frequency components that are shifted can represent a similar distribution as before. For example, as previously discussed, frequency component 320c is frequency shifted from X to Y as frequency component 325c in the set of frequency components 305b. The next frequency component, frequency component 320b, is shifted from M to N as frequency component 325b in the set of frequency components 305b. The frequency range from X to M in frequency components 310b can be the same or similar to the frequency range from Y to N in frequency components 305b.

Moreover, the components of the set of frequency components 310b and 310c are shifted different amounts relative to those in the other set. For example, if the frequency components in the set of frequency components 310b are shifted by K Hz, then the frequency components in the set of frequency components 310c are shifted by L Hz, with L being a higher frequency than K. The amount of frequency shifting can be such that X is shifted to Y, U is shifted to V, and so forth such that each of the frequency components in the sets of frequency components 310b and 310c are shifted to be within a distribution from the F to A Hz range and occupy a unique frequency within the F to A Hz range.

As a result, each of the frequency components in the sets of frequency components 310b and 310c are shifted to the same starting frequency F as the set of frequency components 310a such that they are within a similar frequency range of the set of frequency components 310a and 305a, but each frequency component among the frequency components of sets 305a, 305b, and 305c are unique. That is, the frequency components within the range of F to A for frequency components 305a, 305b, and 305c do not overlap. In some implementations, the frequency components of the sets of frequency components 305a, 305b, and 305c are equally spaced or distributed from F to A Hz. In some implementations, the frequency components alternate from one set to another. For example, the first frequency component can be from the set of frequency components 310a, the second one can be from the set of frequency components 310b, and so forth. As discussed below, this allows for transmit calibration signal 205 to be used to measure the calibration of each of the channels at a similar or same time.

Figure 4:
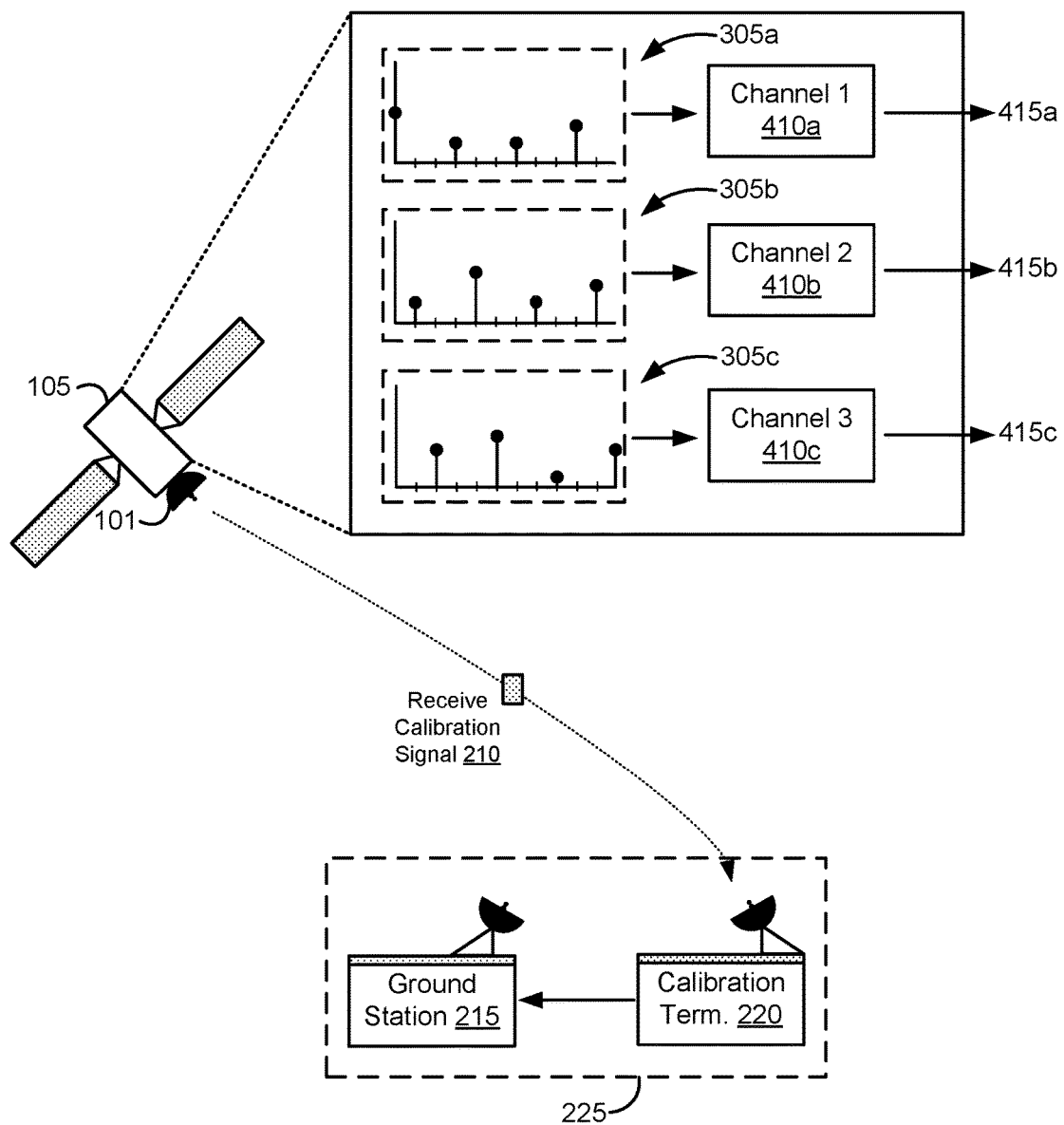
FIG. 4 is an example of a ground station obtaining a calibration signal from a satellite.

When satellite 105 receives transmit calibration signal 215, each of the frequency components can be extracted and the sub-carrier signals corresponding to the sets can be provided to the appropriate channels. For example, in FIG. 4, satellite 105 receives transmit calibration signal 205 and provides the sub-carriers corresponding to the set of frequency components 305a to channel 1 410a, the sub-carriers corresponding to the set of frequency components 305b to channel 2 410b, and the sub-carriers corresponding to the set of frequency components 305c to channel 3 410c. Since the sub-carriers corresponding to the frequency components are non-overlapping in frequency, but concurrent in time (e.g., overlap in time), each of channels 1 410a, channel 2 410b, and channel 3 410c can receive sub-carriers for calibration purposes at the same time, and therefore, under similar physical conditions. As previously discussed, this can result in a more accurate calibration of satellite 105.

As a result, the sub-carriers are processed through channels 1 410a, 2 410b, and 3 410c, which can include filters, amplifiers, channelizers, and other circuitry (or components), resulting in sub-carriers for output signals 415a, 415b, and 415c composing receive calibration signal 210 to be generated. Output signals 415a, 415b, and 415c would be at the same frequencies as the frequency components of the sub-carriers provided to the inputs of the channels. For example, output signal 415a would be similar to the set of frequency components 305a. Accordingly, receive calibration signal 210 is also an OFDM signal with the sub-carriers provided to ground station 215 at the same or similar time, but each of the sub-carriers at different frequencies, similar to transmit calibration signal 205.

Figure 5:
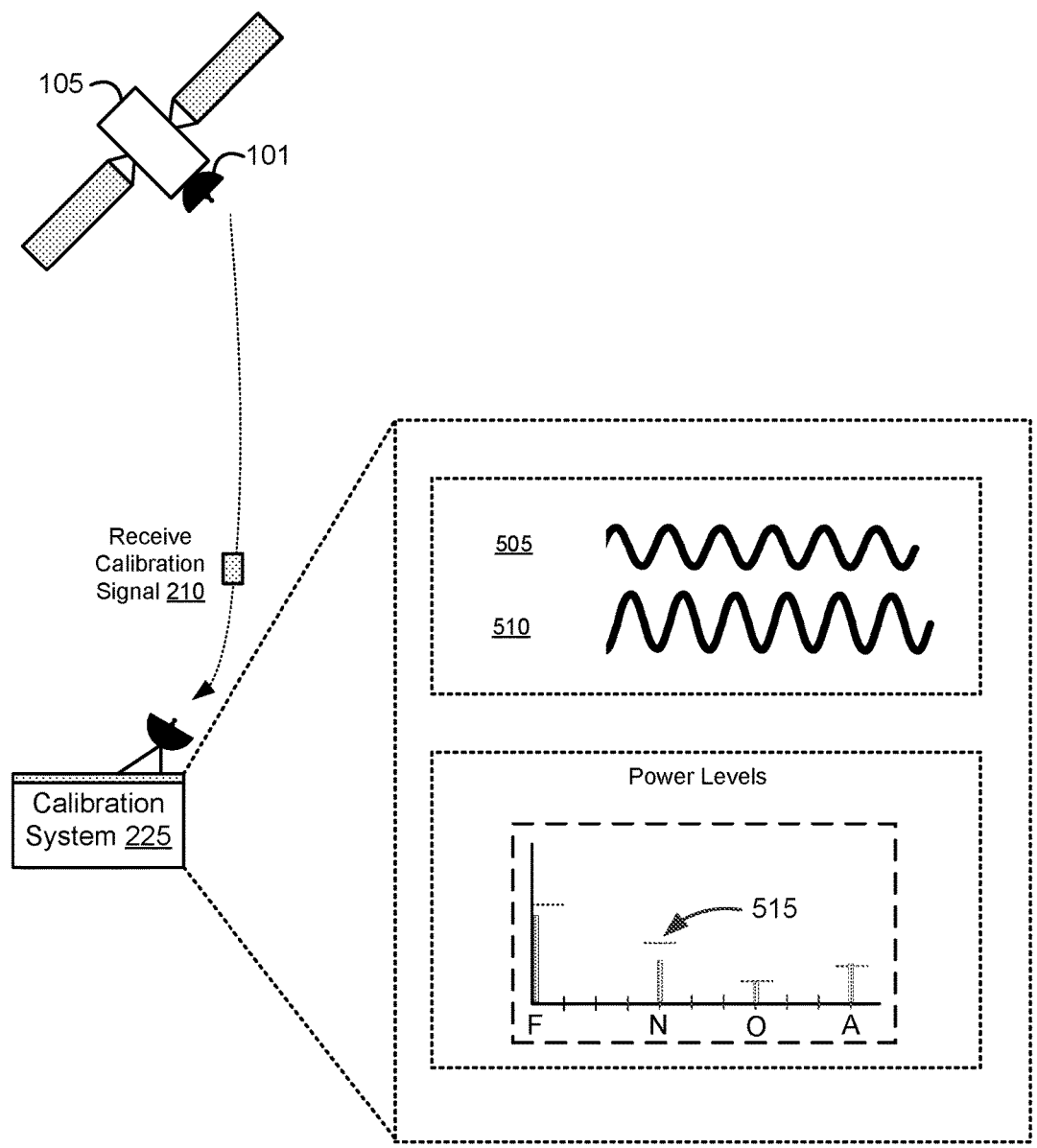
FIG. 5 is an example of adjusting antenna properties to calibrate channels of a satellite.

The sub-carriers from receive calibration signal 210 can be analyzed by ground station 215 to determine differences between the sub-carriers of receive calibration signal 210 and transmit calibration signal 205 by using sub-carriers of reference calibration signal 315. For example, in FIG. 4, calibration terminal 220 receives receive calibration signal 210 from satellite 105 and provides that signal or data representing that signal to ground station 215. The differences can be used to adjust transmission properties antenna of satellite 105 to increase signal power 115 of forward user downlink signal 125. FIG. 5 is an example of adjusting antenna properties to calibrate channels of a satellite.

For example, sub-carrier signal 505 in FIG. 5 can be based on the signal associated with frequency component 325a of the set of frequency components 305a (in FIGS. 3 and 4) propagating through channel 1 410a and provided as a sub-carrier of output signal 415a. Sub-carrier signal 505 can be compared with its corresponding sub-carrier from reference calibration signal 315 that was used to generate transmit calibration signal 205 (in FIG. 3), for example, represented by frequency component 320a of the set of frequency components 310a of reference calibration signal 315. That is, by comparing sub-carrier signal 505 with a corresponding sub-carrier from the reference calibration signal 315, differences between sub-carriers of receive calibration signal 210 and transmit calibration signal 205 can be determined.

The sub-carriers of receive calibration signal 210 that correspond to a frequency component of the set of frequency components 305b and 305c can also be identified from the sub-carriers of reference calibration signal 210 that were frequency shifted. For example, a sub-carrier corresponding to frequency component 325b of the set of frequency components 305b of transmit calibration signal 205 can propagate through channel 2 410b and be provided on output signal 415b, which forms a part of receive calibration signal 210. Frequency component 325b is at the N Hz frequency. Since the N Hz frequency corresponds to the set of frequency components 305b, and the frequency components therein were shifted by K Hz, as previously discussed, this allows for ground station 215 to determine that the reference sub-carrier signal corresponds to frequency component 320b of the set of frequency components 310b at the M Hz frequency of reference calibration signal 315.

Next, the sub-carriers of receive calibration signal 210 can be compared with the corresponding sub-carriers of reference calibration signal 315 to determine differences in the phase, amplitude, and group delay. Additionally, the power levels of the signals can be compared with a threshold power level. If there are differences, then ground station 215 can provide adjustment data to satellite 105 indicating or representing adjustments to be made to change or equalize the differences.

For example, in FIG. 5, sub-carrier signal 505 is out of phase and has a reduced amplitude compared to the corresponding sub-carrier signal 510 of reference calibration signal 315. As a result, ground station 215 of calibration system 225 can determine the magnitude of the differences of the phase and amplitude between sub-carrier signal 505 and sub-carrier signal 510 and it can provide data via a signal (e.g., an adjustment signal providing adjustment data)

to satellite 105 such that channel 1 410*a* should provide a phase shift (e.g., increase or decrease) or change (e.g., increase or decrease) the amplitude of signals provided by its antenna for signals at the frequency corresponding to sub-carrier signal 505 such that it would be similar (e.g., equal) to sub-carrier signal 510 of reference calibration signal 315. Group delay differences can also be adjusted in a similar manner. Adjustment data based on other comparisons of sub-carriers from receive calibration signal 210 and their corresponding sub-carriers from reference calibration signal 315 can also be provided.

Additionally, the power levels of signals at particular frequencies provided by an antenna of a channel can be adjusted. For example, in FIG. 5, power level 515 is the signal power of sub-carrier signal 505 of receive calibration signal 210 (e.g., at the N Hz frequency) as received at ground station 215. The dotted lines in FIG. 5 indicate the threshold power level that should be measured for sub-carriers at the frequencies F, N, O, and A Hz. The threshold power levels for different sub-carriers can be the same or different depending upon various implementations. Since power level 515 is below the threshold power level, ground station 215 can provide data to satellite 105 that it should adjust the signal power of signals provided at the N frequency through channel 1 410*a* and transmitted via its corresponding antenna to be higher so that power level 515 at least reaches the threshold power level. Each of the frequency components of output signal 415*a* can have their signal powers measured and adjusted. For example, in FIG. 5, frequency components at F and A Hz can be adjusted (F to transmit at a higher power and A to transmit at a lower power). Other frequency components of signals at other antennas can be similarly adjusted.

Since some of the frequencies in between (e.g., the two frequencies in between N and O Hz) are not used in that set of frequency components (i.e., they are reserved for another set of frequency components), power levels for those can be interpolated or estimated based on the two neighbor power levels for N and O Hz (e.g., interpolate a straight line between them).

Accordingly, differences between receive calibration signal 210 and reference calibration signal 215 can be determined, adjustment data representing adjustment to transmission properties of antennas of satellite 105 can be generated, and an adjustment signal indicating the adjustment data can be provided to satellite 105 so that it can adjust the transmission properties of the antennas, such as the phase shift, amplitude, group delay, and power levels of signals that they transmit. Since the calibration-related signals provided to and received from satellite 105 are transmitted and received, respectively, as OFDM signals, a more accurate calibration can be performed, as previously discussed. When the adjustment data is applied by satellite 105, it can then transmit forward user downlink signal 125. Since the antennas have had their transmission properties adjusted properly, this allows for forward user downlink signal 125 to be affected by those adjustments, and therefore, signal power 115 can be increased.

After the proper calibration of the transmission properties of the antennas of satellite 105, ground station 215, or another earth-based terminal, may provide beamforming coefficients to take into account drifts and other errors involving satellite 105. That is, the calibration sub-system of FIG. 5 as previously discussed also allows for an environment in which signals can be in a nominal condition for beamforming to be performed.

Figure 6A:
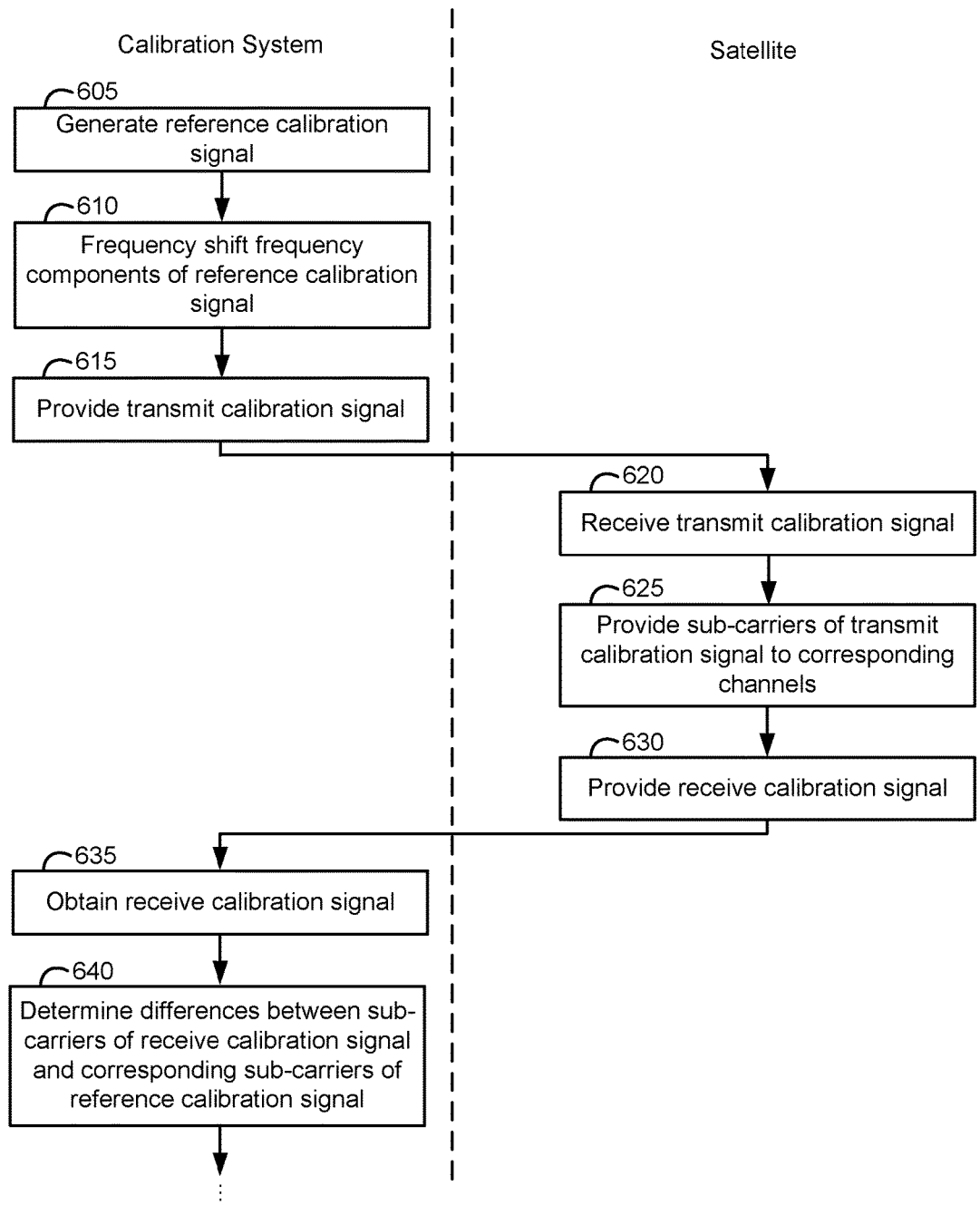
FIGS. 6A and 6B are an example of a flowchart for multi-channel satellite calibration.
Figure 6B:
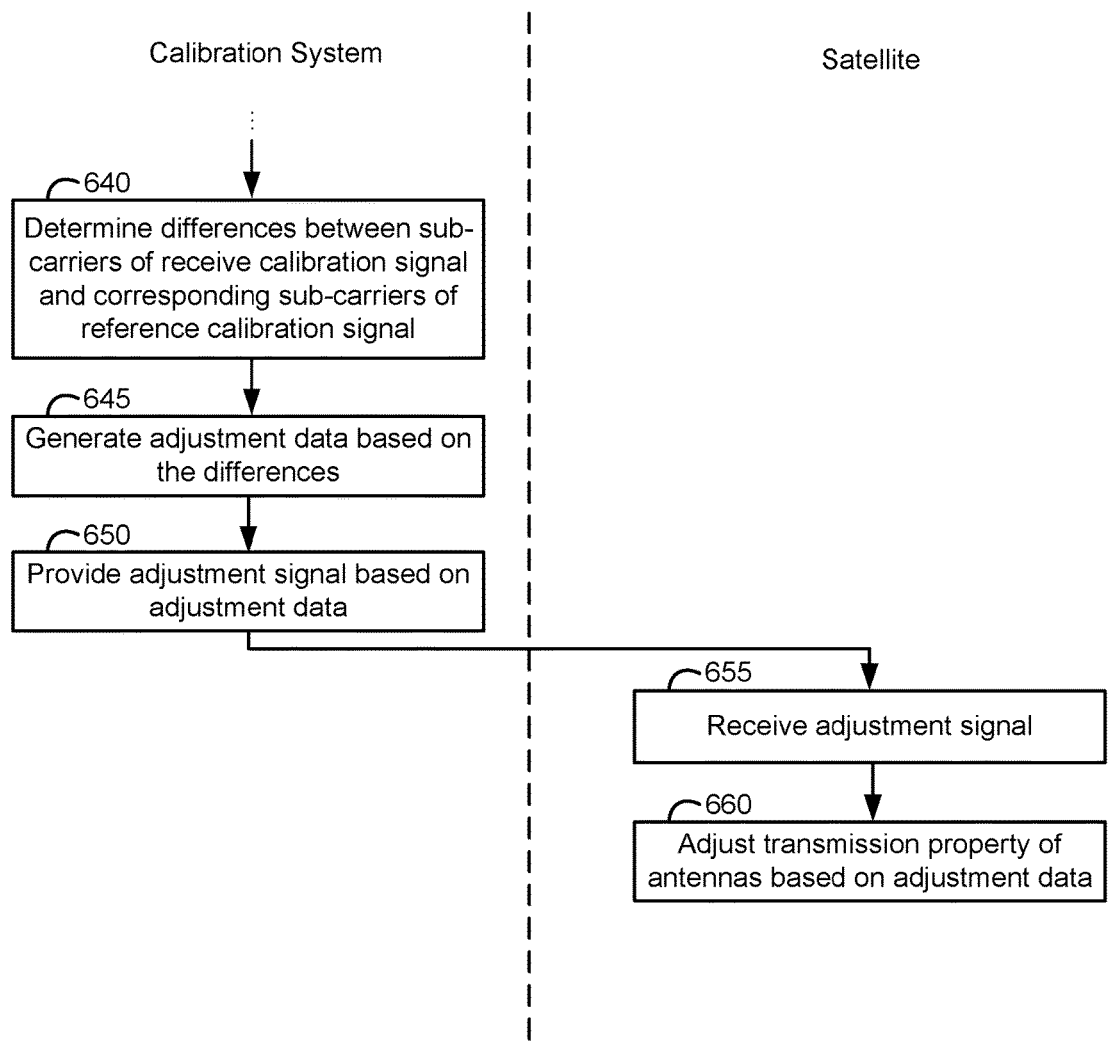

FIGS. 6A and 6B are an example of a flowchart for multi-channel satellite calibration. In block 605, a ground station can generate a reference calibration signal. In some implementations, the ground station can be provided the reference calibration signal by another system. For example, reference calibration signal 315 in FIG. 3 can be provided to ground station 215 of calibration system 225.

At block 610, sub-carriers of the reference calibration signal can be frequency shifted to be within a new frequency range. For example, as in FIG. 3, sub-carriers corresponding to the set of frequency components 310*b* and 310*c* can be frequency shifted such that they distributed within the F to A Hz frequency range that the set of frequency components 310*a* are within. The frequency components can be distributed such that they are evenly spaced within the F to A Hz frequency range and alternate between the different set of frequency components. For example, in FIG. 3, the frequency components for the three sets of frequency components 310*a*, 310*b*, and 310*c* are evenly distributed one-after-another within the F to A Hz range. However, in other implementations, the frequency components can be distributed in another manner (e.g., non-uniform spacing, two-at-a-time from the same set of frequency components, etc.).

At block 615, the ground station can provide a transmit calibration signal to a satellite. For example, in FIG. 3, ground station 215 can generate transmit calibration signal 205 based on the distribution of frequency components (including the frequency shifted ones) and transmit the signal to satellite 105.

At block 620, the satellite can receive the transmit calibration signal. For example, in FIG. 3, transmit calibration signal 205 can be an OFDM signal with sub-carriers at unique frequencies. Different sets of the sub-carriers should be provided to different channels of satellite 105. As a result, in block 625, satellite 105 can extract the sub-carriers of transmit calibration signal 205 and provide specific sub-carriers to specific channels. For example, in FIG. 4, the sub-carriers corresponding to sets of frequency components 305*a*, 305*b*, and 305*c* can be extracted from transmit calibration signal 205 and provided to different channels 1 410*a*, 2 410*b*, and 3 410*c*. Then, at block 630, satellite 105 can provide a receive calibration signal to ground station 215. For example, in FIG. 4, output signals 415*a*, 415*b*, and 415*c* from channels 1 410*a*, 2 410*b*, and 3 410*c*, respectively, can provide sub-carriers for receive calibration signal 210. Receive calibration signal 210 can also be an OFDM signal.

At block 635, the ground station can then receive the calibration signal provided by the satellite. For example, in FIG. 5, ground station can obtain receive calibration signal 210, or data representing receive calibration signal 210, from calibration terminal 220. At block 640, the calibration signal received from the satellite can be demodulate and differences between sub-carriers of the calibration signal received from the satellite and sub-carriers of the reference calibration signal generated at block 605 can be determined. For example, in FIG. 4, the sub-carriers of output signal 415*a* can be compared with sub-carriers based on the set of frequency components 310*a* of reference calibration signal 315 in FIG. 3. The sub-carriers of output signal 415*b* can be compared with sub-carriers based on the set of frequency components 310*b* of reference calibration signal 315. That is, ground station 315 can determine that the sub-carriers of output signal 415*b* were frequency shifted and determine which sub-carriers of reference calibration signal 315 they should be compared with. Likewise, the sub-carriers of output signal 415c can be compared with sub-carriers based on the set of frequency components 310c of reference calibration signal 315.

At block 645, adjustment data based on the differences can be generated. For example, in FIG. 5, sub-carrier 505 can be provided by an antenna of channel 1 410a. Ground station 215 can determine a difference in phase, group delay, and/or amplitude between sub-carrier 505 and its corresponding reference sub-carrier from reference calibration signal 315. The adjustment data can represent the differences. Additionally, any deviation from the power level of sub-carrier 505 and a threshold power level can also be determined and provided with the adjustment data. At block 650, earth station 215 can provide an adjustment signal providing the adjustment data to satellite 105.

At block 655, satellite 105 can receive the adjustment signal. As a result, at block 660, satellite 105 can adjust one or more transmission properties of the antenna for channel 1 410a. For example, the amplitude, phase, group delay, or power levels of signals that it transmits can be adjusted based on the adjustment data.

The calibration sub-systems of earth station 215, calibration terminal 220, and satellite 105 can be implemented with a variety of hardware and software resources. For example, earth station 215 and calibration terminal 220 of calibration system 225 can include antennas, one or more processors, memory, circuits, etc. to implement the techniques described herein. Algorithms can be developed in programming languages, software tools and data formats that may be stored in any type of non-transitory computer-readable storage media to implement the techniques disclosed herein. The various algorithms can be distributed as desired between the ground station 215, calibration terminal 220, and other system locations on the ground such as an Operations Center.

In some implementations, using OFDM signals allows for a time-based averaging of the receive calibration signal 210 to be performed to increase the reliability of the measurement and related techniques disclosed herein. For example, the signals can repeat in the time domain. As a result, ground station 215 can perform several measurements and then average the results of those measurements to generate a representative measurement. This can improve the measurement reliability, for example, by increasing the signal-to-noise ratio (SNR).

Thus, techniques have been disclosed wherein a calibration system determines adjustments to transmission properties of antennas of a satellite. The foregoing merely illustrates principles of the invention. It will thus be appreciated that those skilled in the art will be able to devise numerous systems and methods which, although not explicitly shown or described herein, embody said principles of the invention and are thus within the spirit and scope of the invention as defined by the following claims.

What is claimed is:

1. A system comprising:
a calibration system communicatively coupled with a spacecraft, the calibration system configured to:
transmit an orthogonal frequency division multiplexed (OFDM) calibration signal to a satellite communications network of the spacecraft, the calibration signal including a first plurality of sub-carrier signals;
receive from the spacecraft an OFDM receive calibration signal-including a second plurality of sub-carrier signals;
determine a first set of differences between the first plurality of sub-carrier signals and the second plurality of sub-carrier signals; and
use the determined first set of differences to adjust one or more transmission properties of the spacecraft.

2. The system of claim 1, wherein the one or more transmission properties include signal phases and amplitudes, and the system is further configured to calculate, using the determined first set of differences, equalization adjustments to the signal phases and amplitudes.

3. The system of claim 1, wherein the one or more transmission properties include one or more of a signal phase, amplitude, group delay, or power level.

4. The system of claim 1, wherein the first plurality of sub-carriers are derived from a third plurality of sub-carriers of a reference signal, the reference signal being an orthogonal frequency-division multiplexed (OFDM) signal.

5. The system of claim 4, wherein the third plurality of sub-carriers are compared with the second plurality of sub-carriers to determine a second set of differences between the first plurality of sub-carriers and the second plurality of sub-carriers.

6. The system of claim 5, wherein a first frequency range of the third plurality of sub-carriers is wider than a second frequency range of the second plurality of sub-carriers.

7. The system of claim 6, wherein frequency components corresponding to the third plurality of sub-carriers are frequency shifted to generate the transmit calibration signal.

8. The system of claim 7, wherein the frequency components corresponding to the third plurality of sub-carriers are frequency shifted to be within the frequency range of the second plurality of sub-carriers.

9. A calibration sub-system configured to calibrate transmission properties of antennas of a spacecraft by transmitting an orthogonal frequency-division multiplexed (OFDM) calibration signal to the spacecraft, and receiving an OFDM receive calibration signal from the spacecraft, and providing an adjustment signal representing adjustments to the transmission properties of one or more antennas, the adjustments corresponding to changes to one or more of a phase, amplitude, group delay, or power level of signals provided by the one or more of the antennas based on a comparison of a first plurality of sub-carriers associated with the transmit calibration signal and a second plurality of sub-carriers associated with the receive calibration signal.

10. The calibration sub-system of claim 9, wherein the adjustments correspond to equalization adjustments representing differences between the sub-carriers of the transmit calibration signal with the sub-carriers of the receive calibration signal.

11. The calibration sub-system of claim 9, wherein the calibration sub-system is further configured to generate a reference calibration signal, wherein the sub-carriers of the transmit calibration signal are based on sub-carriers of the reference signal, the reference signal also being an OFDM signal.

12. The calibration sub-system of claim 9, wherein the adjustments are based on differences between the sub-carriers of the transmit calibration signal and the receive calibration signal and on sub-carriers of a reference calibration signal used to generate the transmit calibration signal.

13. The calibration sub-system of claim 12, wherein the sub-carriers of the reference signal are compared with the sub-carriers of the receive calibration signal to determine the differences between the sub-carriers of the transmit calibration signal and the receive calibration signal.

14. The calibration sub-system of claim 13, wherein a frequency range of the sub-carriers of the reference calibration signal is wider than a frequency range of the sub-carriers of the receive calibration signal.

15. The calibration sub-system of claim 14, wherein frequency components corresponding to the sub-carriers of the reference calibration signal are frequency shifted to generate the transmit calibration signal.

16. The calibration sub-system of claim 15, wherein the frequency components corresponding to the sub-carriers of the reference calibration signal are frequency shifted to be within the frequency range of the sub-carriers of the receive calibration signal.

17. A method comprising:
transmitting, by a calibration system, an orthogonal frequency division multiplexed (OFDM) calibration signal having a first plurality of sub-carriers;
receiving, by the calibration system, an OFDM receive calibration system signal having a second plurality of sub-carriers from a spacecraft;
generating, by the calibration system, adjustment data representing differences between the first plurality of sub-carriers and the second plurality of sub-carriers; and
providing, by the calibration system, an adjustment signal providing the adjustment data to adjust transmission properties of one or more antennas of the spacecraft.

18. The method of claim 17, wherein the adjusting the transmission properties include changes to one or more of a phase, amplitude, group delay, or power level of signals provided by one or more of the antennas of the spacecraft.

19. The method of claim 17, wherein the transmit calibration signal is based on a reference calibration signal having sub-carriers at a wider frequency range than the first plurality of sub-carriers.

20. The method of claim 17, wherein the transmit calibration signal is an orthogonal frequency-division multiplexed (OFDM) signal.

* * * * *